United States Patent

[11] 3,613,603

| | | |
|---|---|---|
| [72] | Inventor | Howard Reisman<br>Moorestown, N.J. |
| [21] | Appl. No. | 39,437 |
| [22] | Filed | May 21, 1970 |
| [45] | Patented | Oct. 19, 1971 |
| [73] | Assignee | Bakery Specialty Machinery Co.<br>Moorestown, N.J. |

[54] DETACHABLE BEARING FOR EXTRUDER
4 Claims, 5 Drawing Figs.

[52] U.S. Cl. .................................. 107/14 C,
308/15
[51] Int. Cl. .................................. A21c 11/16
[50] Field of Search ......................... 308/15.58,
15.59, 35, 36, 26, 78, 106; 107/14 R, 14 C, 14 CA;
17/35-40; 18/12-14, 30; 25/8, 12, 14; 72/253,
262; 100/144-146

[56] References Cited
UNITED STATES PATENTS

| 2,192,665 | 3/1940 | Robben et al. | 308/15 |
| 2,337,290 | 12/1943 | Yost | 308/15 |
| 2,668,066 | 2/1954 | Stadelhofer | 308/15 X |
| 3,415,206 | 12/1968 | Reisman | 107/14 R |
| 3,457,880 | 7/1969 | Eppenberger | 107/14 R |
| 3,511,190 | 5/1970 | Kunz | 107/14 R |

*Primary Examiner*—Jordan Franklin
*Assistant Examiner*—Geo. V. Larkin
*Attorney*—Connolly and Hutz ABSTRACT: A cylindrical bearing in a hub is supported within and near the exit from an extrusion channel by a spider loosely engaged within recessed pockets in the wall of the extrusion channel. The legs of the spider are inserted or removed through entrance slots in the end of the channel which connect with the sides of the recesses. This allows the blind portions of the recesses adjacent the exit end of the wall to provide pockets for retaining the legs. The propelled doughy mass fills in the spaces between the legs and the pockets within which they are inserted and forces the spider into firm contact with the recesses to securely lock them in place and firmly support the bearing. The slotted recesses may be conveniently provided within a wear-resistant sleeve which forms the wall of the channel. The bearing element utilizes a food grade lubricant when dough for baking products, such as pretzel is extruded.

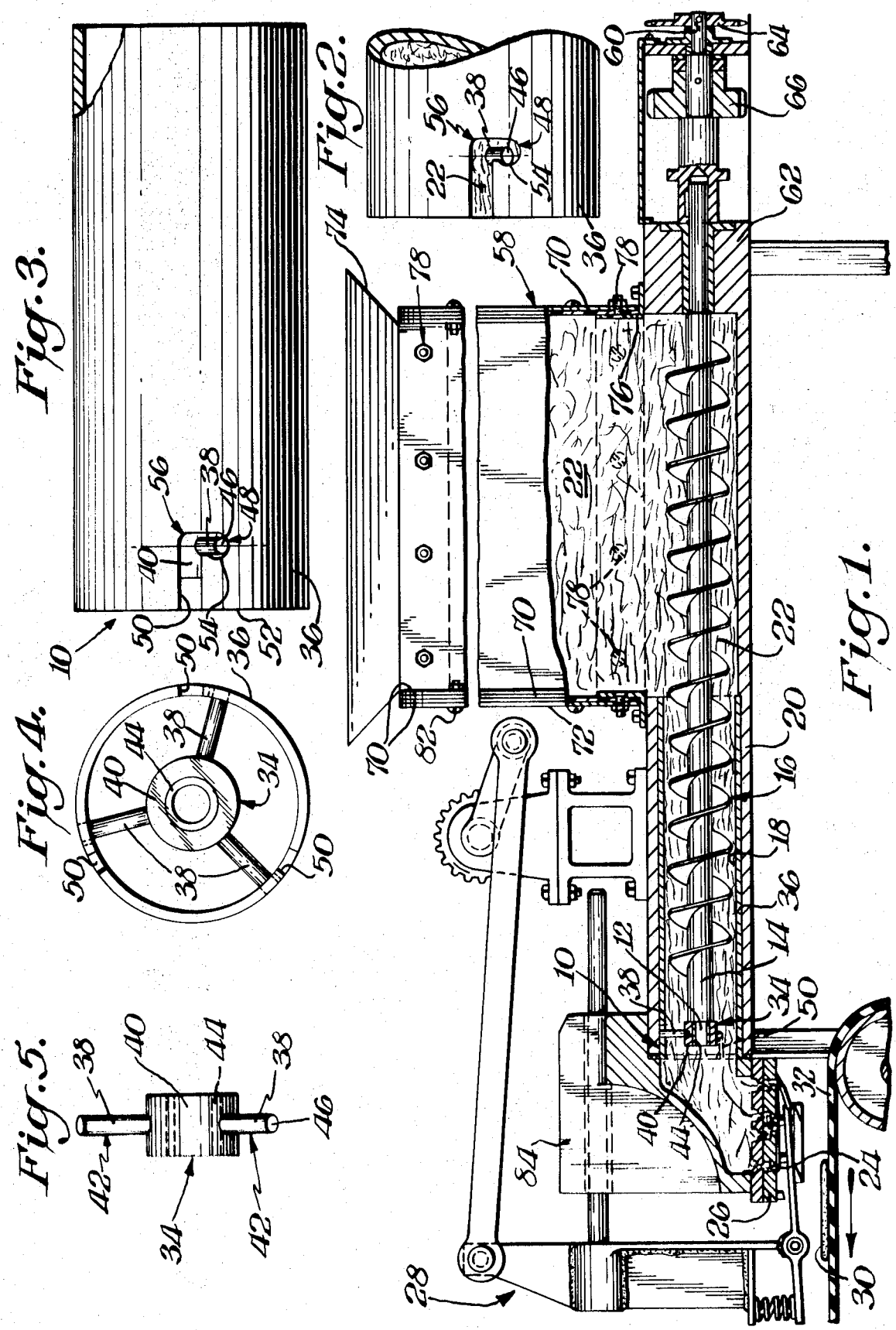

3,613,603

DETACHABLE BEARING FOR EXTRUDER

BACKGROUND OF THE INVENTION

This invention relates to a detachable bearing for supporting the exit end of the shaft of an extrusion screw and it more particularly relates to such a bearing for an extruder which propels a doughy mass, for example, dough used in pastry products. The baking industry widely utilizes dough extrusion for making a wide variety of baked products including pretzel products, cookies, doughnuts and the like. The driven ends of the extrusion screws are routinely supported in suitable bearings disposed outside of contact with the dough being propelled and expressed. The exit ends of the extrusion shafts are however unsupported to avoid interference with the flow of dough past them and to simplify construction, maintenance and cleaning. A shaft having such an unsupported exit end is described in U.S. Pat. No. 3,415,206, entitled "Pretzel Forming."

An object of this invention is to provide a simple and economical detachable bearing for the exit end of the shaft of an extrusion screw for propelling a doughy mass and more particularly to provide one which can be easily installed and removed and which does not materially impede the flow of dough.

SUMMARY

A cylindrical bearing is supported in a hub by a spider loosely engaged within recessed pockets disposed in the wall at the exit end of the extrusion channel. The legs of the spider are inserted or removed through entrance slots between the end of the channel and the sides of the recesses to allow the blind portions of the recesses adjacent the exit end of the wall to provide pockets for retaining the legs. The propelled doughy mass fills in the spaces between the legs and the pockets within which they are inserted and forces the spider into firm contact with the recesses to securely lock them in place and firmly support the bearing. The slotted recesses may be conveniently provided within a wear-resistant sleeve which forms the wall of the channel.

BRIEF DESCRIPTION OF THE DRAWING

Novel features and advantages of the present invention will become apparent to one skilled in the art from a reading of the following description in conjunction with the accompanying drawing wherein similar reference characters refer to similar parts and in which:

FIG. 1 is a side view in elevation substantially broken away in cross section of one embodiment of this invention;

FIG. 2 is a side view in elevation of a portion of the embodiment shown in FIG. 1 in its position during active operation;

FIG. 3 is an assembled side view in elevation of the embodiment shown in FIG. 1;

FIG. 4 is a side end view of the embodiment shown in FIG. 3; and

FIG. 5 is a side elevational view of the inner portion of the embodiment shown in FIGS. 3 and 4.

DESCRIPTION OF THE PREFERRED EMBODIMENT

In FIG. 1 is shown a detachable bearing assembly 10 for the exit end 12 of the shaft 14 of extrusion screw 16 mounted within the wall 18 of extrusion channel 20. Extrusion screw 16 propels a doughy mass 22 through extrusion channel 20 which is formed into a shaped stream 24 by propulsion through extrusion plate 26 in a manner similar to that described in aforementioned U.S. Pat. No. 3,415,206.

As described in U.S. Pat. No. 3,415,206, stream of dough 24 is in the form of pretzels and cutoff mechanism 28 cleanly severs individual pretzel forms 30 which drop on conveyor belt 32 for subsequent processing and baking.

The exit end 12 of shaft 14 of extrusion screw 16 is supported within bearing unit 34 to concentrically support screw 16 within channel 20. Bearing assembly 10 includes assembled sleeve 36 and bearing unit 34 shown in detail in FIGS. 3–5. In FIGS. 3–5 legs 38 are shown connected to hub 40 of bearing unit 34 and extending radially outwardly therefrom. Legs 38 and hub 40 are, for example, made of corrosion resistant material such as stainless steel. Legs 38 form a spider 42 for supporting bearing unit 34 within channel 20. Cylindrical bearing element 44 is inserted within hub 40 to provide a lubricated bearing support for shaft end 12. Bearing element 44 is, for example, a porous bearing sleeve impregnated with a lubricant; and when used in conjunction with dough for bakery products is saturated with an approved food grade of oil.

The outer ends 46 of legs 38 are disposed within apertures or recesses 48 within sleeve 36, which is made of wear and corrosion resistant stainless steel. Recesses 48 are thus conveniently provided within the wall 18 of extrusion channel 20. Recesses 48 are larger than corresponding ends 46 of legs 38 received therewithin. Entrance slots 50 extend from the exit end 52 of sleeve 36 into the sides of recesses 48. Slots 50 are wider than legs 38 to facilitate passage therethrough. The disposition of slots 50 in the sides of recesses 48 provides blind pockets 54 in the exit sides of recesses 48 for retaining leg outer ends 46. The outer circumference of an imaginary circle around the ends 46 of legs 38 and corresponding spider 42 is slightly smaller than the outer circumference of sleeve 36 to provide a slight clearance for insertion and removal of legs 38 into and out of recesses 48. A suitable clearance is, for example, 0.010 inch. Recesses 48 and entrance slot 50 together comprise bayonet-type slots 56 for receiving legs 38 of bearing spider 42. Bearing spider 42 is substantially loosely inserted within bayonet-type slots 56 in the absence of a doughy mass 22 within extruder channel 20.

The end 60 of shaft 14 opposite exit end 12 extends under and past dough-feeding hopper 58 and the rear end 62 of extrusion channel 20. End 60 is driven by sprocket 64 and a drive connection and mechanism not shown. Spur gear 66 engages with a similar spur gear (not shown) upon a parallel extrusion screw (not shown) to drive them together in a pair of aligned channels.

The flow of dough 22 through hopper 58 is facilitated by a unique self-lubricating tetrafluoroethylene polymer lining 70. Lining 70 comprises flexible sheets of a tetrafluoroethylene polymer approximately 0.20 inch thick. Lining 70 is locked within hopper 58 by having the ends of sheets 70 secured between the flanges formed by the ends of hopper walls 72, upper funnel section 74 and lower angular frame 76 inserted within hopper walls 72. Cap screw and nut assemblies 78 secure upper funnel 74 and lower frame within walls 72 with ends of sheets 70 firmly secured between them. The inner heads 80 of capscrew assembly 78 are flat and countersunk to minimize obstruction to the flow of dough. Outer and capscrew and nut assemblies 82, securing the flanges of hopper walls 72 together, are out of the stream of dough and therefore need not be specially shaped. Lined hopper 58 remarkably minimizes resistance to the flow of dough through it because of its self-lubricating lining even though lining sheets 70 are flexible and somewhat loosely disposed within hopper 58. The Teflon brand of tetrafluoroethylene polymer made and sold by the duPont Company of Wilmington, Delaware is suitable for use as sheets 70.

Even though leg ends 46 are loosely installed within recesses 48 in the absence of a doughy mass within channel 20, they are remarkably securely locked within blind pockets 54 of recesses 48 when dough is propelled through extruder channel 20 as shown in detail in FIG. 2. Dough 22 forces leg ends 46 firmly into pockets 54 and fills all the space between recess 48 and leg ends 46. Bearing assembly 10 is thus surprisingly firmly locked in position while dough 22 is being propelled through extruder channel 20, which firmly and steadily supports bearing unit 34 during active operation of extrusion screw 16.

Bearing unit 34 may easily be removed for cleaning or replacement when extrusion screw 16 is not being operated and the dough is removed from channel 20. Extrusion head 84 may be unbolted from the exit end of channel 20 to provide free access to bearing unit 34, which may then be easily grasped, rotated and withdrawn through bayonet-type slots 56 by virtue of the ample clearances between leg ends 46 and all traversed portions of bayonet-type slots 56. Dough 22 which forces legs 46 into firm engagement with pockets 54 is easily broken away and removed while extruder screw 16 is inactive. A firm support for the exit end 12 of shaft 14 is thus uniquely provided by an arrangement which is remarkably easy to install and remove.

I claim:

1. An apparatus for producing shaped articles comprising structure including a wall with an extrusion channel therein, an integral shaft and extrusion screw in said channel for propelling a doughy mass therethrough, the shaft having an exit end, a detachable bearing for the shaft comprising a hub, a cylindrical bearing element mounted within said hub, a spider having several legs connected to said hub and extending outwardly therefrom, recesses in the wall of said channel adjacent its exit end for retaining the outer ends of said legs, the length of said legs being arranged for disposition of said outer ends within said recesses and to dispose said bearing substantially concentrically within said channel for supporting said exit end of said extrusion shaft substantially concentrically within said channel, entrance slots in the exit end of said channel extending from the exit end of said channel into said recesses, said slots and said recesses being wider than said legs to facilitate the insertion of said legs through said slots into said recesses, the dimensions of said legs being sufficiently less than corresponding dimensions of said slots and recesses whereby free insertion and removal of said legs into said pockets is facilitated, and said slots being disposed in a side of said recesses remote from said exit end of said channel whereby said recesses provide retaining pockets for said legs disposed toward said exit end of said channel within which said legs are securely locked by said propelled doughy mass to firmly support said exit end of said shaft during its propelling operation.

2. A detachable bearing as set forth in claim 1 wherein a cylindrical sleeve is disposed within said channel to provide said wall and said recesses, and said slots comprise bayonet-type slots in the exit end of said sleeve.

3. A detachable bearing as set forth in claim 1 whereby said cylindrical bearing element comprises a porous bearing sleeve impregnated with a lubricant.

4. A detachable bearing as set forth in claim 1 wherein the dimensions of said legs, said recesses and said slots are arranged to provide a clearance between mating portions thereof of at least approximately 0.010 inch.